(12) United States Patent
Kawamoto et al.

(10) Patent No.: US 9,008,070 B2
(45) Date of Patent: Apr. 14, 2015

(54) INFORMATION COMMUNICATION APPARATUS AND PROGRAM STORAGE MEDIUM

(75) Inventors: Yasutaka Kawamoto, Hyogo (JP); Yuki Kubo, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 415 days.

(21) Appl. No.: 13/433,271

(22) Filed: Mar. 28, 2012

(65) Prior Publication Data

US 2012/0250671 A1 Oct. 4, 2012

(30) Foreign Application Priority Data

Mar. 29, 2011 (JP) .................................. 2011-072717

(51) Int. Cl.
*H04W 4/00* (2009.01)
*H04L 29/06* (2006.01)
*H04L 12/801* (2013.01)

(52) U.S. Cl.
CPC .............. *H04L 29/06* (2013.01); *H04L 47/10* (2013.01)

(58) Field of Classification Search
None
See application file for complete search history.

(56) References Cited

U.S. PATENT DOCUMENTS

| 2001/0027494 | A1* | 10/2001 | Deo et al. ...................... 709/247 |
| 2004/0141490 | A1* | 7/2004 | Hong ............................ 370/345 |
| 2004/0184475 | A1* | 9/2004 | Meier ........................... 370/449 |
| 2005/0220145 | A1* | 10/2005 | Nishibayashi et al. ....... 370/474 |
| 2006/0133408 | A1* | 6/2006 | Nogueira-Nine et al. .... 370/447 |
| 2009/0213970 | A1* | 8/2009 | Kubo ............................ 375/356 |
| 2011/0044170 | A1* | 2/2011 | Kure et al. .................... 370/235 |

FOREIGN PATENT DOCUMENTS

| EP | 1657852 A1 | 5/2006 |
| JP | 2003-078565 A | 3/2003 |
| JP | 2005-318487 A | 11/2005 |
| WO | WO 2009-096332 A1 | 8/2009 |

\* cited by examiner

*Primary Examiner* — Ian N Moore
*Assistant Examiner* — Brian T Le
(74) *Attorney, Agent, or Firm* — Rabin & Berdo, P.C.

(57) ABSTRACT

An information communication apparatus may include a request buffer, a request sorting device, a sending device, a frame generating device, and a frame transmitting device. A request buffer may store transmission requests corresponding to frames. A request sorting device may sort the transmission requests. A sending device may send the sorted transmission requests in accordance with a transmission timing that is determined based on destinations of the frames and in which a receiving node can receive the frames. A frame generating device may generate frames based on the received transmission requests. A frame transmitting device configured to transmit the generated frames.

17 Claims, 4 Drawing Sheets

INFORMATION COMMUNICATION APPARATUS AND PROGRAM STORAGE MEDIUM

CROSS-REFERENCE TO RELATED APPLICATION

This application claims priority under 35 U.S.C. §119 from Japanese Patent Application NO. P 2011-072717, filed on Mar. 29, 2011, the disclosure of which is incorporated herein by reference.

BACKGROUND OF THE INVENTION

1. Field of the Invention

This application relates to the art of communication in sensor network constituted by nodes as communication terminals.

2. Description of the Related Art

"IEEE802.15.4" is one of the communication standards that has an upper layer of communication, which may be wireless, such as a MAC layer or a PHY layer. If a transmitting node transmits data or a command, the transmitting node transmits frames, such as data frames or command frames, to a receiving node in the order the request is received from the upper layer.

European Patent Application No. EP1657852 filed on Nov. 15, 2004, relating to CSL (Coordinated Sampled Listening) describes a system and method used for saving power during communication when a transmitting node transmits frames in synchronization with an intermittent reception timing of a receiving node. During the intermittent reception timing, the receiving node may receive frames. If the receiving node receives frames using the intermittent reception timing, the receiving node enters a startup state and then proceeds into a standby mode. If the receiving node will not receive frames, the receiving node enters a resting state to suppress an output of power from a battery. In this state, the receiving node cannot receive a frame, but power consumption is suppressed.

If the transmitting node transmits frames by the CSL method, there may be an appreciable amount of time lag between reception of transmission requests of an upper layer to the actual transmission of frames. If the transmitting node receives information of an established intermittent transmission timing of the receiving nodes, the transmitting node transmits the frames efficiently based on such timing. If however the transmitting node does not receive information of the established intermittent transmission timing, the transmitting node must search for such timing information so as to transmit the frames in accordance with the timing. The searching generally takes a lot of time compared to transmitting frames based on known intermittent transmission timing.

The CSL method also has a frame continuation transmitting function. When performing this function, the transmitting node may continuously transmit several frames to the receiving node. A frame includes a frame pending bit that indicates whether the frames are currently being transmitted on a continuous basis. If the frame pending bit corresponds to an "ON" state, the continuous transmission of the frames has started. If the frame pending bit corresponds to an "OFF" state, the continuous transmission of the frames has ended.

If frame transmission requests are continuously made for frames that will be sent to a single receiving node, each frame pending bit included in the respective requested frame will be in an "ON" state after frame transmission requests that have the same destination are made, and the frames are then transmitted. The frame transmission requests are prepared individually for each frame, so the frame transmission requests are a group of individually prepared frame transmission requests. The receiving node continues in a standby mode between transmissions of the frames so as to receive the frames successively without entering a resting state.

The frame pending bits of frames are turned into an "ON" state prior to transmission of the frames. The transmitting node transmits all frames that have the same destination, as a whole over a period of time based on the intermittent reception timing of the receiving node. Therefore, the time required to transmit the frames is shortened.

In the prior art, when the transmitting node is to transmit the frames, the order of transmission of the frames is first established. For example, a storage device included by the transmitting node may have a FIFO (First In First Out) buffer that stores the frame transmission requests temporarily. When operating with a FIFO buffer, the frames are transmitted in the same order as they are stored.

If the frames are transmitted by the above method, the following problems are caused. The frames that have identical destinations may need to be stored continuously in the FIFO buffer, so that the FIFO buffer can participate in the frame continuation transmitting function using the CSL method. However, the frame transmission requests are not always stored continuously in the FIFO buffer. Therefore, a case may occur where the continuous transmitting function cannot be properly used, and throughput decreases.

The following example illustrates when a failure to execute a continuous transmitting function is inefficient. A FIFO buffer may store a first frame transmission request that is to be transmitted to a receiving node A (this request is called A1), a second frame transmission request that is to be transmitted to a receiving node B (this request is called B1), and a third frame transmission request that is to be transmitted to the receiving node A (this request is called A2) in this order. Each of the receiving nodes A and B has an intermittent reception timing. In other words, nodes A and B each have repeating periods during which the node may receive a frame. For instance, node A may have a first receiving period and a second receiving period during which node A may receive frames. Similarly, node B may have a receiving period during which node B may receive a frame.

Both the first and second receiving periods of node A may occur before the receiving period for node B. Therefore, for maximum efficiency, the FIFO buffer may need to transmit frames corresponding to requests A1 and A2 continuously to node A. However, the frame corresponding to the request B1 is stored in the FIFO buffer between the frames corresponding to the requests A1 and A2 and therefore the FIFO buffer is not able to transmit the frames corresponding to the requests A1 and A2 continuously. Instead, the FIFO buffer must transmit the frames corresponding to the requests A1, B1 and then A2 in that order, which decreases efficiency since now the frame corresponding to request A2 is transmitted during a later receiving period than the second receiving period of node A. Thus, throughput decreases.

Node A has been described as receiving frames corresponding to requests A1 and A2 during different receiving periods. However, in some cases node A may receive frames corresponding to requests A1 and A2 during one receiving period. Thus, a receiving node may receive several frames during the same receiving period continuously.

SUMMARY OF THE INVENTION

An object of the application is to disclose an information communication apparatus and a program storage medium that may decrease throughput of wireless communication.

According to one aspect, an information communication apparatus may include a request buffer, a request sorting device, a sending device, a frame generating device, and a frame transmitting device. The request buffer stores transmission requests corresponding to frames. The request sorting device sorts the transmission requests. The sending device sends the sorted transmission requests in accordance with a transmission timing that is determined based on destinations of the frames and at which a receiving node can receive the frames. The frame generating device generates frames based on the received transmission requests sent by the sending device. The frame transmitting device transmits the generated frames.

According to another aspect, an information communication apparatus may include a request acquisition device, a frame generating device, a frame sorting device, a frame transmission timing configuration device, and a frame transmitting device. The request acquisition device stores transmission requests. The frame generating device generates frames that correspond respectively to transmission requests. The frame sorting device sorts the generated frames. The sending device sends the sorted frames in accordance with transmission timings that are determined based on destinations of the generated frames, and at which a receiving node can receive the frames. The frame transmitting device transmits the received frames.

According to still another aspect, an information communication apparatus may include a request acquisition device, a frame generating device, a frame buffer, a frame sorting device, a frame transmission timing configuration device, and a frame transmitting device. The request acquisition device stores transmission requests corresponding to frames. The frame generating device generates frames that correspond respectively to transmission requests. The frame buffer stores the generated frames. The frame sorting device sorts the stored frames so that if the request acquisition device acquires one or more transmission requests that have the same destination as the stored frames, one or more generated frames that correspond to the one or more acquired transmission requests are arranged to transmit continuously after the stored frame. The sending device sends the sorted frames in accordance with transmission timing that is determined based on destinations of the frames and at which a receiving node can receive the frames. The frame transmitting device transmits the received frames.

According to another aspect, a program storage medium has a computer program available to use for an information communication apparatus including a request buffer, a request sorting device, a sending device, a frame generating device, and a frame transmitting device. The computer program may include the steps of storing transmission requests corresponding to frames, sorting the transmission requests, sending the sorted transmission requests in accordance with a transmission timing that is determined based on destinations of the frames at which a receiving node can receive the frames, generating frames based on the received transmission requests, and transmitting the generated frames.

According to another aspect, a program storage medium has a computer program available to use for an information communication apparatus including a request acquisition device, a frame generating device, a request sorting device, a sending device, and a frame transmitting device. The computer program may include the steps of storing transmission requests, generating frames that correspond respectively to the stored transmission requests, sorting the generated frames, sending the sorted frames in accordance with transmission timing that is determined based on destinations of the frames and at which a receiving node can receive the frames, and transmitting the sorted frames.

BRIEF DESCRIPTION OF THE DRAWINGS

The information communication apparatus and the program storage medium will be more fully understood from the following detailed description with reference to the accompanying drawing, which is given by way of illustration only, and is not intended to limit the invention, wherein.

DETAILED DESCRIPTION OF THE INVENTION

An embodiment of an information communication apparatus and a program storage medium will be described with reference to FIGS. 1 to 4. In the embodiments described herein, the information communication apparatus and the program storage medium are used in the art of wireless communication networks. However, the information communication apparatus and the program storage medium may be used not only in the art of wireless communication networks, but also in other communication networks.

First Embodiment

Figure 1:
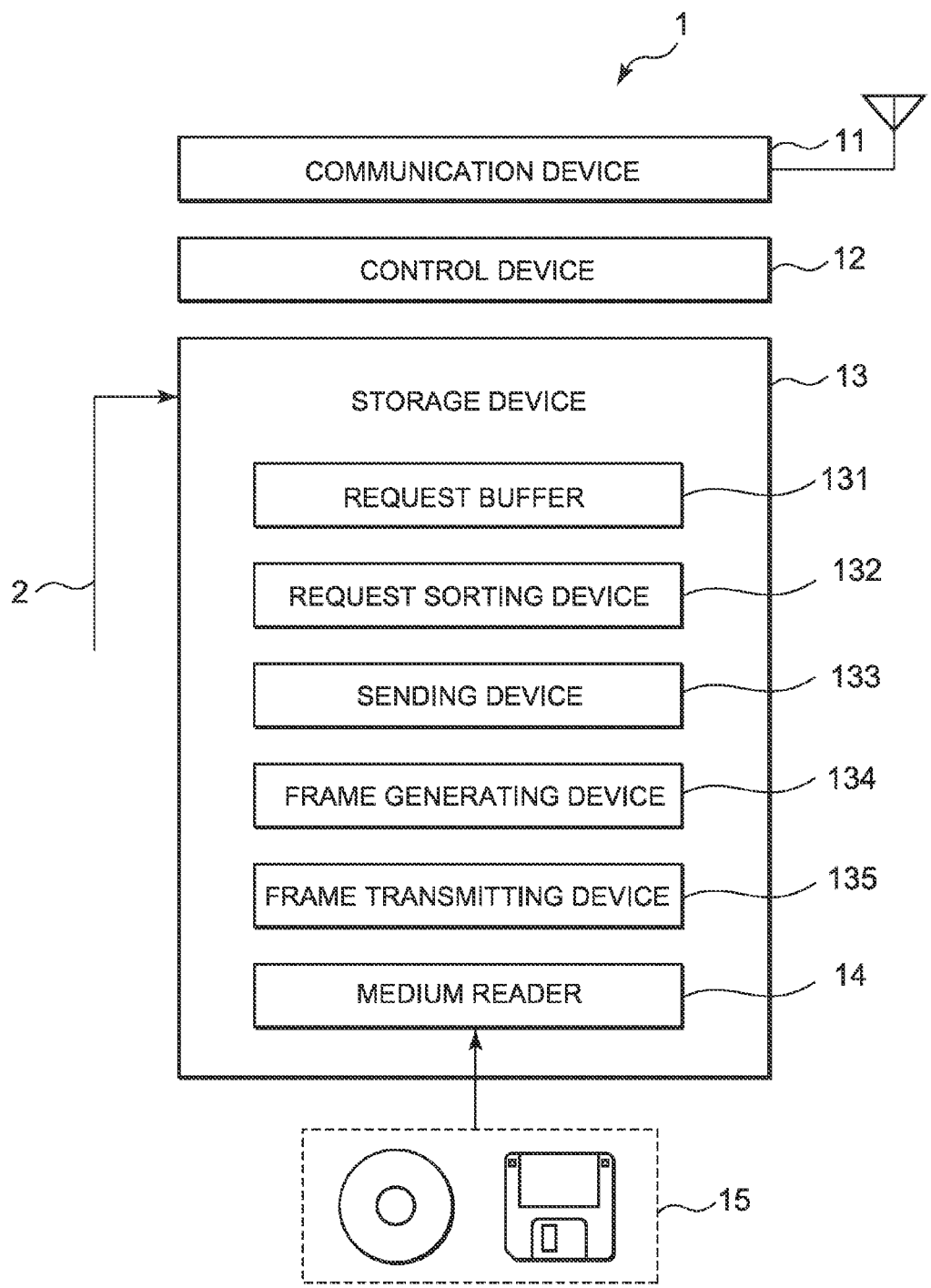
FIG. 1 illustrates a composition of an information communication apparatus according to a first embodiment.

FIG. 1 illustrates a composition of an information communication apparatus 1 and program storage media 15 according to a first embodiment. The information communication apparatus 1 may be a node configured to a sensor network that performs wireless communication in accordance with communication standard of "IEEE802.15.4e". A plurality of information communication apparatuses 1, or nodes, may be included and each node may operate by the CSL method. A network line 2 transmits signals received from an upper layer of communication, to the information communication apparatus 1. The information communication apparatus 1 may include a communication device 11, a control device 12, a storage device 13, and a medium reader 14. The respective functions of communication device 11, control device 12, storage device 13, and medium reader 14 may be implemented using appropriate hardware. The storage device 13 may include a request buffer 131, a request sorting device 132, a sending device 133, a frame generating device 134, and a frame transmitting device 135, which have functions that may be implemented by software.

The communication device 11 may be an interface to transmit and receive frames to and from other nodes of the sensor network. The communication device 11 also may include an antenna. The control device 12 may be a Central Processing Unit (CPU). The control device 12 also may execute processing by the information communication apparatus 1 that will be described below.

The storage device 13 may be configured using a Read Only Memory (ROM), a Random Access Memory (RAM) or an Erasable Programmable Read Only Memory (EEPROM). The storage device 13 also may store programs to execute communications by the CSL method. In other words, any of the operations or functions discussed herein may be implemented on a Non-Transitory Computer-Readable Media.

The request buffer 131 may store the frame transmission requests received from an upper layer, such as a MAC layer or a PHY layer. The request buffer 131 may store the frame transmission requests in a FIFO form, a LIFO (Last In First Out) form or a FILO (First IN Last Out) form. A frame transmission request corresponds to a single frame, and the frame transmission requests form a group of the frame transmission requests. A frame transmission request may include destination information of the frame, such as discrimination information of a receiving node, and information of a transmission timing for the frame. As an example, the transmission timing to the receiving node may be based upon an intermittent reception timing of the receiving node.

If the information of the transmission timing is first established in the upper layer, the transmission timing is included in the information of the frame transmission request. If however the information of the transmission timing is not first established in the upper layer, the transmission timing is determined by the upper layer by searching for the transmission timing. For example, the searching procedure may include transmission by the upper layer of a "Wakeup Signal" to the receiving node for a given period of time, and reception of a confirmation (ACK signal) corresponding to when the "the Wakeup Signal" is received.

A transmitting node may go into a "transmitting standby" mode according to the transmission timing. In other words, the transmitting node "wakes up" when the transmission timing occurs but is otherwise in a standby mode. A timing of the transmitting standby mode may be installed by the upper layer. If the timing of transmission to the receiving node is not first established in the transmitting node, a maximum transmitting standby time determined by the upper layer is installed.

The request sorting device 132 may sort the frame transmission requests stored by the request buffer 131, in accordance with a prescribed algorithm and timing. The details of the algorithm will be described later.

The sending device 133 may transmit the frame that is at the head of the sorted request buffer 131 to the frame generating device 134 based on the transmission timing included in the frame transmission request. At the transmission timing, the sending device 133 may order the request buffer 131 to send the frame transmission request to the frame generation device 134.

In some cases the frames may be transmitted continuously when the destination node has a reception timing that is continuous. Thus, if the CSL method is executed, the frames may be transmitted successively, for example continuously. During continuous transmission, the sending device 133 may transmit information indicating that the frames are to be transmitted continuously to the frame generating device 134.

The frame generating device 134 may generate the frames in accordance with the frame transmission requests received from the sending device 133 and the prescribed information from the upper layer. If the frame generating device 134 receives the information that the frames are to be transmitted continuously from the sending device 133, frame pending bits of the generated frames will be turned to an "ON" state by the frame generating device 134.

The frame transmitting device 135 may transmit the frames generated by the frame generating device 134 to the destination node. The destination node is determined from the frame transmission requests for the frames to be transmitted. Here, the frame, the destination, and the frame transmission request correspond to each other.

The medium reader 14 may read program storage media 15 that store program executed by the storage device 13. An optical disk, a magnetic disk, a magnetic tape, a nonvolatile memory card, or a ROM may be used as the program storage media 15. This program may be downloaded from the upper layer, or through the communication device 11.

Figure 2:
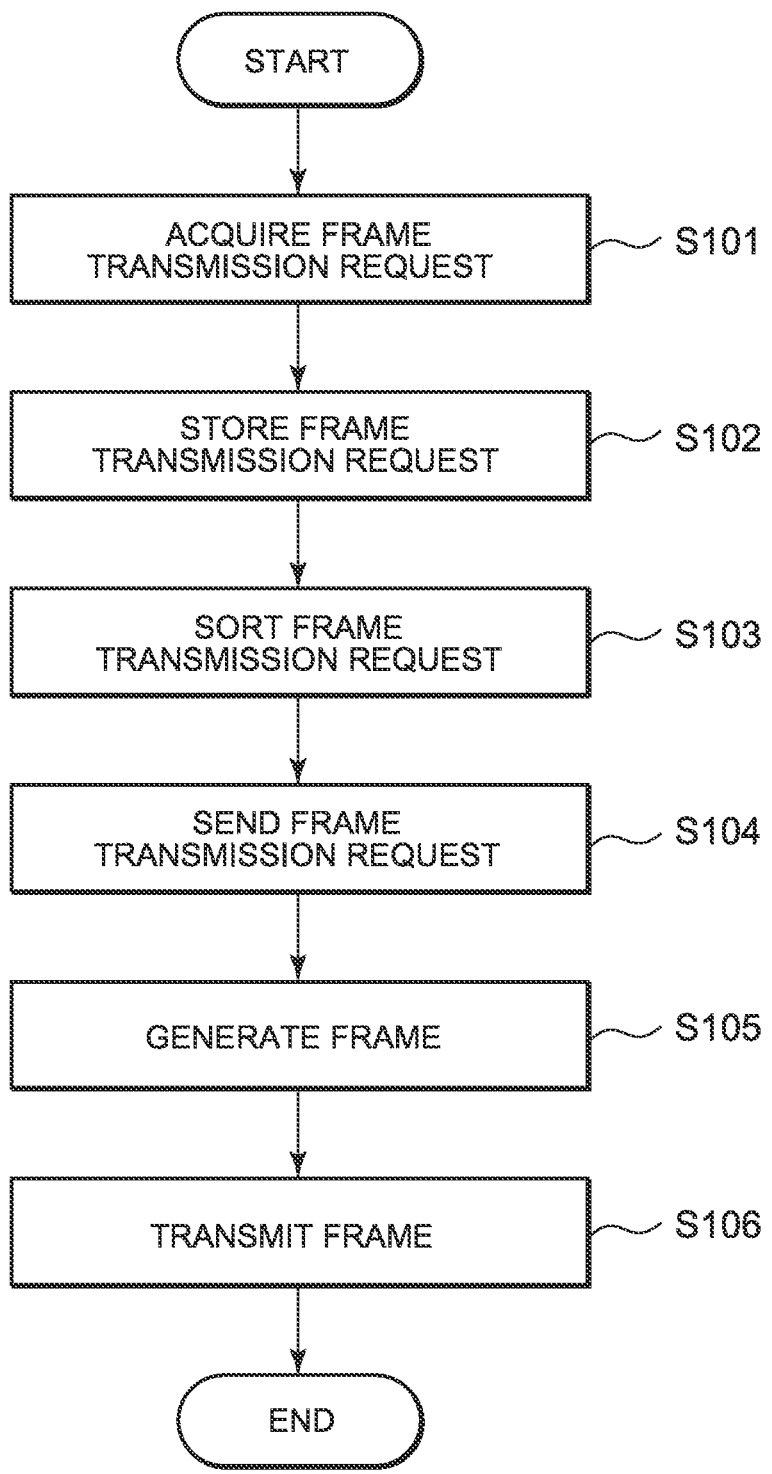
FIG. 2 is an operation flow chart according to the first embodiment.

FIG. 2 is an operation flow chart according to the first embodiment. The processing of the information communication apparatus 1 may be implemented by the control device 12 that controls devices stored in the storage device 13. The software works harmoniously with the hardware. In FIG. 2, the control device 12 and the storage device 13 are arranged as software. However, instead of software, the information communication apparatus 1 may include hardware devices that include the function of the control device 12 and the storage device 13, or a combination of hardware and software.

At step S101, the control device 12 acquires the frame transmission requests from the upper layer.

At step S102, the request buffer 131 stores the acquired frame transmission requests in the order of acquisition thereof.

At step S103, the request sorting device 132 sorts the stored frame transmission requests in accordance with the prescribed algorithm and timing. In this embodiment, the algorithm is called a "sort algorithm", and the timing is called "sort timing".

At step S104, the sending device 133 sends the sorted frame transmission requests based on the transmission timing of each frame. The frame transmission requests all have transmission timings that are different from each other.

At step S105, the frame generating device 134 generates the frames in accordance with the received frame transmission requests.

At step S106, the frame transmitting device 135 transmits the generated frames to the destination included in the frame transmission request. The frame transmission requests all specify destinations that may be different from each other. However, in some cases one or more of the frame transmission requests may specify the same destination.

Next, examples of the sort timing implemented by the request sorting device 132 will be described.

In the case of sort timing 1, when the request sorting device 132 acquires one or more new frame transmission requests from the upper layer, and when the one or more new frame transmission requests are added to the request buffer 131, the request sorting device 132 sorts the frame transmission requests.

In the case of the sort timing 2, the request sorting device 132 sorts the frame transmission requests every time a predetermined repeating timing is reached. Information of the predetermined timing is stored in the storage device 13.

In the case of the sort timing 3, when the sending device 133 orders the request buffer 131 to send the frame transmission requests to the frame generation device 134, the request sorting device 132 sorts the frame transmission requests.

Furthermore, the sort timing may be not limited to any one sort timing, and may combine from the sort timing 1 to 3 arbitrarily.

Next, examples of the sort algorithm implemented by the request sorting device 132 will be described.

In the case of sort algorithm 1, the request sorting device 132 sorts the frame transmission requests in a queue based upon the receiving times of the receiving nodes. For example, the frame transmission requests are sorted in the same order as that of the intermittent reception timing of the receiving nodes. Therefore, if the receiving node is in a state corresponding to an intermittent reception timing so as to receive a frame, the request sorting device 132 may transmit a commensurate frame.

In the case of sort algorithm 2, the request sorting device 132 sorts the frame transmission requests so that the frame transmission requests that have a same destination continue after each other to be sent continuously. Therefore, the CSL method may be available, and transmission of the frame transmission requests may be executed within a short time period. The sort algorithm 2 may be implemented more easily than the sort algorithm 1, because this process may take only one iteration to complete. Furthermore, the frame pending bits will be turned to an "ON" state, because the frame transmitting device 135 may transmit the generated frames continuously based on the sorted frame transmission requests that have the same destination.

In the case of the sort algorithm 3, the request sorting device 132 sorts specific frame transmission requests to arrange them at the head of the queue of the sorted request buffer 131. The specific frame transmission requests that have the same destination as that of the frame transmission request that was already sent to the frame generating device 134 by the sending device 133, are moved to the head of the queue. As a result, the frame transmission requests that have a same destination may be sent to the frame generating device 134 continuously. Therefore, the CSL method may be available, and the transmission of the frames may be executed in a short time period. The sort algorithm 3 may implemented more easily than the sort algorithm 2, because only the specific frame transmission requests are sorted.

Furthermore, the frame pending bits will be turned to an "ON" state, because the frame transmitting device 135 may transmit the generated frames continuously based on the sorted frame transmission requests.

In the case of sort algorithm 4, the request sorting device 132 sorts the frame transmission requests to arrange frame transmission requests that do not have the frame transmission timing of the destination node, last in the queue of request buffer 131. Transmitted frames may be erased from the storage area of the storage device 13. The transmission of a frame that requires a long period of time for transmission may be postponed by placing such a frame transmission request last in the queue of the request buffer 131. Since the transmission of other frames may be completed in a shorter time compared to the frames that require a long period of time to transmit, and the transmitted frames may be erased from the storage area of the storage device 13, free storage space within the storage device 13 may increase quickly during early steps of the processing.

In the case of sort algorithm 5, the request sorting device 132 sorts the frame transmission requests to arrange frame transmission requests that do not have the frame transmission timing of the destination node at the head of the queue of the sorted request buffer 131. The transmission of a frame that needs a long period of time for transmission may be executed primarily by placing such a frame transmission request first in the request buffer 131. Since the transmission of all frames may be completed in a short amount of time, this algorithm is faster than the sort algorithm 1.

Furthermore, the sort algorithms 1 to 5 may be combined arbitrarily in the range without inconsistency.

According to the first embodiment, irrespective of the order of execution of the transmission requests from the upper layer, throughput of wireless communication does not decrease by sorting the frame transmission requests to increase the speed of transmission of the frame.

Second Embodiment

A second embodiment will be described. In the explanation of the second embodiment, features common to the first embodiment are omitted, and primarily features different than those of the first embodiment are described.

In the first embodiment, the frame transmission requests are sorted. However, in the second embodiment, frames generated based on the frame transmission requests are sorted.

Figure 3:
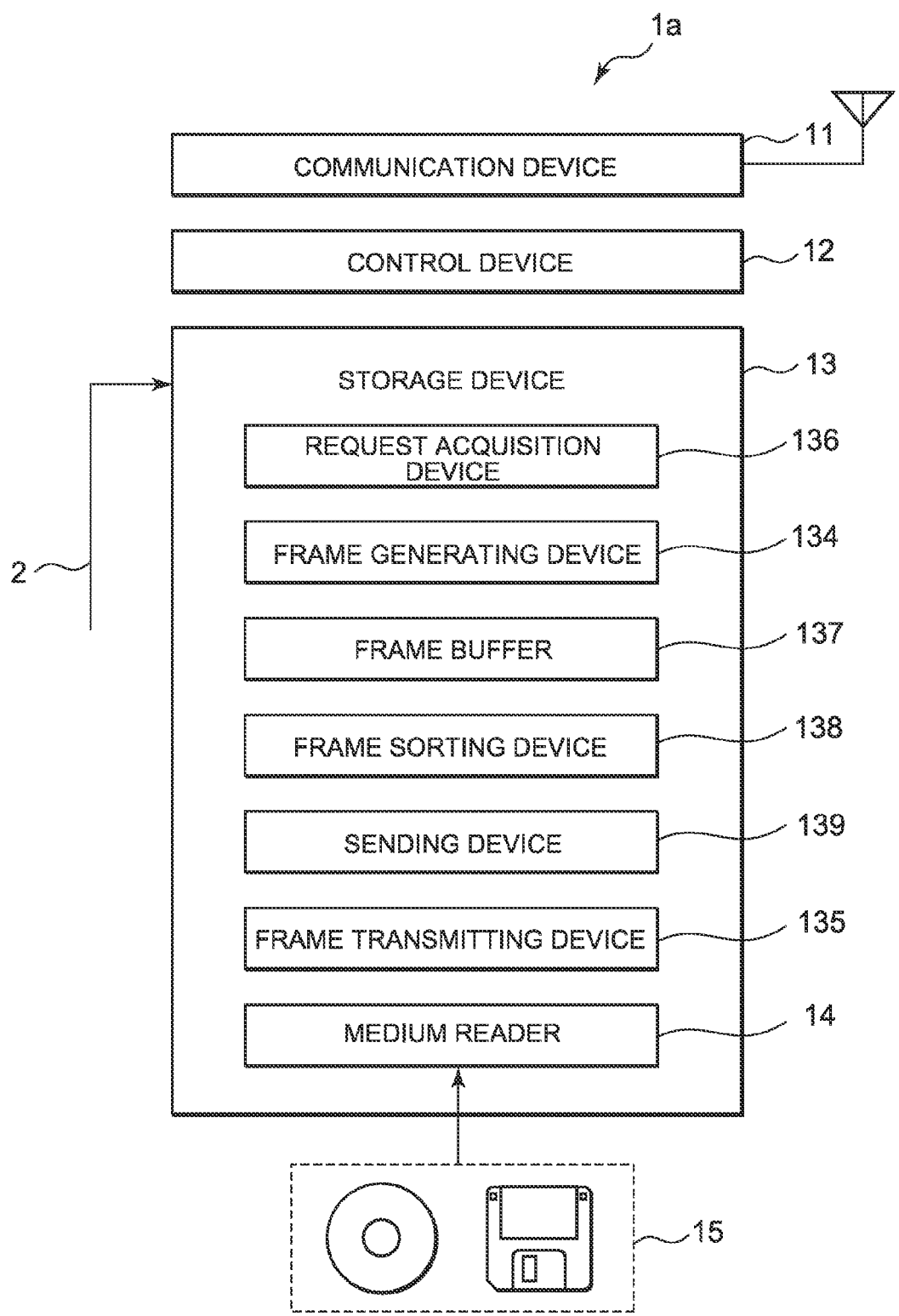
FIG. 3 illustrates a composition of an information communication apparatus according to a second embodiment.

FIG. 3 is composition diagram of an information communication apparatus 1*a* and the program storage media 15 of the second embodiment. In the information communication apparatus 1*a* and the program storage media 15 of the second embodiment, parts that are the same as those of the information communication apparatus 1 and the program storage media 15 of the first embodiment are designated by the same symbols. The information communication apparatus 1*a* may include the communication device 11, the control device 12, the storage device 13, and the medium reader 14 of the first embodiment. The respective functions of the communication device 11, control device 12, storage device 13, and medium reader 14 may be implemented using appropriate hardware, software or a combination thereof. The storage device 13 may include the frame generating device 134 and the frame transmitting device 135 of the first embodiment, a request acquisition device 136, a frame buffer 137, a frame sorting device 138, and a sending device 139, which have functions that may be implemented by software, hardware or a combination thereof. The storage device 13 also may include programs to execute communications by the CSL method.

The request acquisition device 136 may acquire the frame transmission requests from the upper layer of communication, and order the frame generating device 134 to generate a frame corresponding to the single frame transmission request. The frame transmission requests form a group of the frame transmission requests, and the frames consist of groups of the frames.

The frame buffer 137 may store the frames generated by the frame generating device 134 in a FIFO form, a LIFO (Last In First Out) form or a FILO (First IN Last Out) form.

The frame sorting device 138 may sort the frames stored by the frame buffer 137 in accordance with a prescribed algorithm and timing. The details of the algorithm will be described later.

The sending device 139 may send the frame that is at the head of the sorted frame buffer 137. The sending is executed based on transmission timing included in the frame transmission request corresponding to the frame. When the transmission timing is such that the receiving node may receive the frame, the sending device 139 may order the frame buffer 137 to send the frame to the frame transmitting device 135.

In some cases, the frames may be transmitted continuously when the destination node has a reception timing that is continuous. Thus, if the CSL method is executed, the frame may be transmitted continuously. During continuous transmission of the frames, the frame pending bits of the frames will be turned to an "ON" state.

Figure 4:
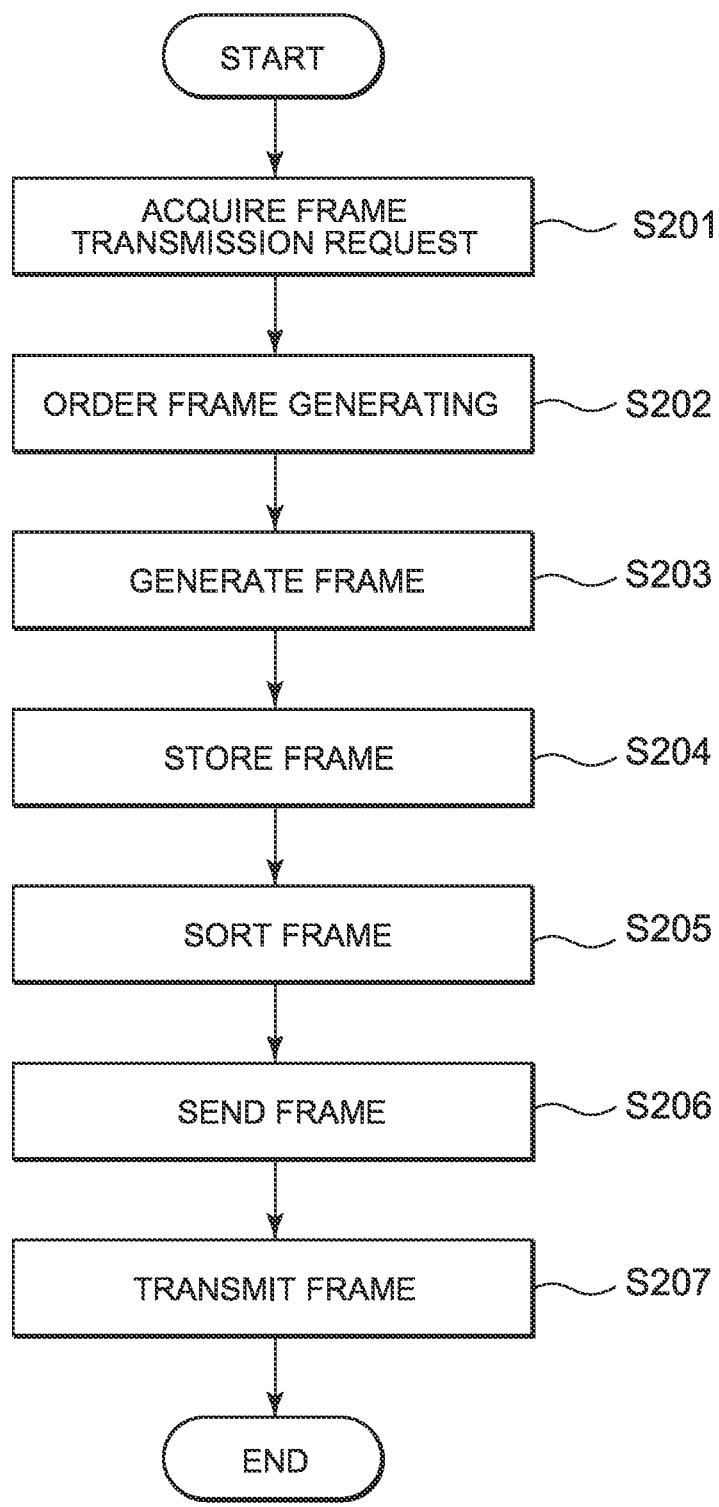
FIG. 4 is an operation flowchart according to the second embodiment.

FIG. 4 is an operation flowchart according to the second embodiment. The processing of the information communication apparatus 1*a* may be implemented by the control device 12.

At step S201, the request receiving device 136 acquires the frame transmission requests from the upper layer.

At step S202, the control device 12 orders the frame generating device 134 to generate the frames based on the frame transmission requests and the prescribed information from the upper layer.

At step S203, the frame generating device 134 generates the frames corresponding to the frame transmission requests. The frames each correspond to a frame transmission request that is different from the other frame transmission requests.

At step S204, the frame buffer 137 stores the generated frames based upon the times frames are generated by the frame generating device 134. In other words, the frame buffer 137 stores the generated frames based upon the acquiring times of the request receiving device 136.

At step S205, the frame sorting device 138 sorts the stored frames in accordance with the prescribed algorithm and timing. In this embodiment, the algorithm is called a "sort algorithm", and the timing is called "sort timing."

At step S206, the sending device 139 sends the sorted frames to the frame transmitting device 135 based upon the transmission timing. Each frame corresponds to frame transmission requests different from the other frame transmission requests, and the frame transmission requests all have transmission timings that are different from each other.

At step S207, the frame transmitting device 135 transmits the received frames to the destinations described in the corresponding frame transmission requests. The frame transmission requests each specify a destination for the corresponding received frame that may be different from the other destinations for the other received frames. However, in some embodiments, one or more of the received frames may specify the same destination.

Next, the sort timing by the frame sorting device 138 will be described.

In the case of the sort timing 1a, the frame sorting device 138 sorts the frames when one or more new frames generated by the frame generating device 134 are added to the frame buffer 137.

In the case of the sort timing 2a, the frame sorting device 138 sorts the frames at predetermined times. Information relating to the predetermined times is stored in the storage device 13.

In the case of the sort timing 3a, the frame sorting device 138 sorts the frames when the sending device 139 orders the frame sorting device 138 to send the frames to the frame transmitting device 135.

Furthermore, the sort timing is not limited to any one of the above sort timings 1a, 2a and 3a, which may be combined arbitrarily.

Next, the sort algorithm by the frame sorting device 138 will be described.

In the case of the sort algorithm 1a, the frame sorting device 138 sorts the frames in a queue based upon the receiving times of the receiving nodes. For example, the frames are sorted in the order of intermittent reception timing of the receiving nodes. Therefore, if the intermittent reception timing of the receiving node is occurring so that the receiving node may receive a frame, the request sorting device 132 may transmit commensurate frames without delay.

In the case of the sort algorithm 2a, the frame sorting device 138 sorts the frames so that the frames that have a same destination continue to be sent continuously after each other. Therefore, the CSL method may be available. The sort algorithm 2a also may be implemented more easily than the sort algorithm 1a, because this process may take only one iteration to complete. Furthermore, the frame pending bits will be turned to an "ON" state, because the frame transmitting device 135 may transmit the sorted frames continuously.

In the case of the sort algorithm 3a, the frame sorting device 138 sorts for specific frames to arrange the specific frames at the head of the queue of the sorted frame buffer 137. The specific frames having the same destination as the destination of the frame sent to the frame transmitting device 135 by the sending device 139, are moved to the head of the queue. Therefore, the CSL method may be available, and the transmission of the frames may be executed within a short time period. The sort algorithm 3a also may be implemented more easily than the sort algorithm 2a, because only the specific frames are grouped together.

Furthermore, the frame pending bits will be in an "ON" state, because the frame transmitting device 135 may transmit the sorted frames continuously.

In the case of the sort algorithm 4a, the frame sorting device 138 sorts the frames to arrange frames that do not have the frame transmission timing of the destination node, last in the queue of frame buffer 137. Transmitted frames may be erased from the storage area of the storage device 13. The transmission of a frame that requires a long period of time for transmission may be postponed by placing such a frame last in the queue of the frame buffer 137. Since the transmission of other frames may be completed in a shorter time as compared to the frame that requires a long period of time to transmit, storage space within the storage device 13 may increase quickly during early steps of processing as the transmitted frames are removed from the storage device 13.

In the case of the sort algorithm 5a, the frame sorting device 138 sorts the frames to arrange frames that do not have the frame transmission timing of the destination node, at the head of the queue of the sorted frame buffer 137. A frame that needs a long period of time for transmission may be executed primarily by placing such a frame first in the frame buffer 137. Since the transmission of all the frames may be completed in a short amount of time, this algorithm is faster than the sort algorithm 1a.

Furthermore, the sort algorithm from 1a to 5a may be combined arbitrarily without inconsistency.

In addition, when the frame buffer 137 transmits the frame arranged at the head of the queue thereof to the frame transmitting device 135, the control device 12 may control other components to execute the following processing that could not be executed when the frame is generated. The first process is to assign a sequence number to the frame. The second process is to assign a timestamp to the frame. The third process is to assign a unique identifier to the frame. The fourth process is to encrypt the frame.

According to the second embodiment, even if the frame transmission requests are executed in no particular order from the upper layer, throughput of wireless communication does not decrease because the frames are sorted to increase the efficiency of transmission of the frames.

Also, even if a frame cannot be transmitted during a transmission timing of the frames, it may be possible to generate the frame. As a result, the transmission of the frame is more efficient than with the first embodiment.

All or some composition of the software described in the embodiment also may be executed by hardware.

Implementations such as the above-described hardware and the software may be modified without diverting from the spirit of the invention, as will be well understood by those skilled in the art.

What is claimed is:
1. An information communication apparatus for transmitting frames to a receiving node comprising:
    a non-transitory, storage medium storing:
        a request buffer configured to store a plurality of transmission requests corresponding to the frames to be transmitted;
        a request sorting device configured to sort the transmission requests;
        a sending device configured to send the sorted transmission requests in accordance with transmission timings that are determined based on time periods during which destinations of the frames to be transmitted are able to receive said frames to be transmitted;

a frame generating device configured to receive the sent transmission requests and to generate the frames to be transmitted based on the received transmission requests; and a frame transmitting device configured to transmit the generated frames to the frame destinations with the transmission timings, so that the transmitted frames are received at the frame destinations during the time periods, the request sorting device sorting the transmission requests so that a group of the transmission requests, corresponding to a first group of the frames to be transmitted that each have a same destination among the frame destinations, are sent successively by the sending device, so that the frames of the first group are transmitted in succession by the frame transmitting device, wherein the request sorting device sorts the transmission requests based upon the transmission timings, so that a second group of the frames to be transmitted, which have a group of the frame destinations corresponding to a group of the transmission timings earlier than that of corresponding destinations among the frame destinations of other frames among the frames to be transmitted, are transmitted before said other frames.

2. The information communication apparatus of claim 1, wherein the request sorting device sorts the transmission requests so that one of the transmission requests corresponding to one of the frames to be transmitted, which lacks information relating to a corresponding one of the transmission timings, is arranged at a head of the sorted transmission requests.

3. The information communication apparatus of claim 1, wherein the request sorting device sorts the transmission requests so that one of the transmission requests corresponding to one frame of the frames to be transmitted, that lacks information relating to a corresponding one of the transmission, is arranged last in the sorted transmission requests.

4. The information communication apparatus of claim 1, wherein the request sorting device sorts the transmission requests so that transmission requests that correspond to a third group of the frames to be transmitted, that have a same destination among the frame destinations as a head frame of the frames to be transmitted corresponding to one of the transmission requests that is at a head of the sorted transmission requests, are arranged so that said third group of the frames to be transmitted are successively transmitted with the head frame.

5. The information communication apparatus of claim 1, wherein the request sorting device sorts the transmission requests when the request buffer stores the transmission requests.

6. The information communication apparatus of claim 1, wherein the request sorting device sorts the transmission requests at a predetermined repeating timing.

7. The information communication apparatus of claim 1, wherein the request sorting device sorts the transmission requests when one of the transmission requests is sent by the sending device.

8. An information communication apparatus for transmitting frames to a receiving node, comprising:

a request acquisition firmware or hardware device configured to store a plurality of transmission requests;

a frame generating device configured to generate the frames to be transmitted, the frames to be transmitted corresponding respectively to the transmission requests;

a frame sorting device configured to sort the generated frames;

a sending device configured to send the sorted frames in accordance with transmission timings that are determined based on time periods during which destinations of the sorted frames are able to receive the plurality of frames; and a frame transmitting device configured to receive the sent frames and transmit the received frames to the frame destinations with the transmission timings, so that the transmitted frames are received at the frame destinations during the time periods, the frame sorting device sorting the generated frames so that a first group of the generated frames that each have a same destination among the frame destinations, are sent successively by the sending device so that the frames of the first group are transmitted successively by the frame transmitting device, wherein the frame sorting device sorts the frames based upon the transmission timings, so that a second group of the generated frames, which have a group of the frame destinations corresponding to a group of the transmission timings earlier than that of corresponding destinations of the frame destinations of other frames among the generated frames, are transmitted before said other frames.

9. The information communication apparatus of claim 8, wherein the frame sorting device sorts the generated frames so that one of the generated frames, that lacks information relating to a transmission timing among the transmission timings that corresponds to a corresponding destination among the frame destinations, of the one frame, is arranged at a head of the sorted frames.

10. The information communication apparatus of claim 8, wherein the frame sorting device sorts the generated frames so that one of the generated frames, which lacks information relating to a corresponding transmission timing among the transmission timings, is arranged last in the sorted frames.

11. The information communication apparatus of claim 8, wherein the frame sorting device sorts the generated frames so that a third group of the frames, that have a same destination among the frame destinations as that of a head frame among the generated frames that is at a head of the sorted frames, are arranged to be successively transmitted after the head frame.

12. The information communication apparatus of claim 8, further comprising a request buffer that stores the generated frames, wherein the frame sorting device sorts the generated frames when the request buffer stores the generated frames.

13. The information communication apparatus of claim 8, wherein the frame sorting device sorts the generated frames at a predetermined repeating timing.

14. The information communication apparatus of claim 8, wherein the frame sorting device sorts the generated frames when one of the generated frames is sent by the sending device.

15. An information communication apparatus for transmitting frames to a receiving node, comprising:

a request acquisition firmware or hardware device configured to store a plurality of transmission requests corresponding to the frames to be transmitted;

a frame generating device configured to generate the frames to be transmitted that correspond respectively to the transmission requests;

a frame buffer configured to store the generated frames;

a frame sorting device configured to sort the generated frames so that if the request acquisition firmware or hardware device acquires a transmission request that corresponds to a frame that has a same destination as one or more others of the stored frames, all the generated frames are sorted so that the generated frames that have the same destination are consecutively arranged;

a sending device configured to send the sorted frames in accordance with transmission timings that are determined based on time periods during which destinations, including said same destination, of the generated frames are able to receive the generated frames; and a frame transmitting device configured to receive the sent frames and transmit the received frames to the frame destinations with the transmission timings, so that the transmitted frames are received at the frame destinations during the time periods, the frame sorting device sorting the stored frames so that a first group of the generated frames that each have a same destination among the frame destinations as a head frame, are arranged to be successively sent with the head frame by the sending device so as to be transmitted with the head frame so that the frames of the first group are transmitted successively by the frame transmitting device, wherein the frame sorting device sorts the generated frames based upon the transmission timings, such that a second group of the generated frames, which have a group of the frame destinations corresponding to a group of the transmission timings earlier than that of corresponding destinations among the frame destinations of other frames among the generated frames, are transmitted before said other frames.

16. A non-transitory program storage medium having a computer program for an information communication apparatus for transmitting frames to a receiving node that when implemented executes the steps of:

storing a plurality of transmission requests corresponding to the frames to be transmitted, the frames to be transmitted corresponding to destinations for receiving said frames to be transmitted, the destinations corresponding to transmission timings that are determined based on time periods during which the frame destinations are able to receive said frames;

sorting the transmission requests by
arranging successively a first group of the transmission requests, that correspond to a first group of the frames to be transmitted that each have a same frame destination among the frame destinations,
arranging the transmission requests based upon the transmission timings, so that a second group of the transmission requests, which correspond to a second group of the frames to be transmitted that have a group of the frame destinations corresponding to transmission timings earlier than that corresponding to destinations among the frame destinations of other frames among the frames to be transmitted corresponding to other transmission requests, are arranged before the other transmission requests corresponding to said other frames;

sending the sorted transmission requests in accordance with the transmission timings that are determined based on the time periods during which the destinations of the frames are able to receive the frames;

generating the frames based on the sent transmission requests; and transmitting the generated frames to the frame destinations with the transmission timings, so that
the transmitted frames are received at the frame destinations during the time periods,
the frames of the first group are transmitted successively, and
the second group of the frames are transmitted before the other frames.

17. A non-transitory program storage medium having a computer program for an information communication apparatus for transmitting frames to a receiving node, that when implemented executes the steps of:

storing a plurality of transmission requests;
generating the frames to be transmitted, the frames to be transmitted corresponding respectively to the stored transmission requests, the frames to be transmitted corresponding to destinations for receiving the frames to be transmitted, the destinations corresponding to transmission timings that are determined based on time periods during which the frame destinations are able to receive the frames to be transmitted;

sorting the generated frames by
arranging successively a first group of the generated frames that each have a same frame destination among the frame destinations, and
arranging a second group of the generated frames based upon the transmission timings, so that the second group of the frames, which correspond to a group of the frame destinations corresponding to a group of the transmission timings earlier than that corresponding to destinations among the frame destinations of other frames among the frames to be transmitted, are arranged before said other frames;

sending the sorted frames in accordance with the transmission timings that are determined based on the time periods during which the frame destinations are able to receive the frames; and transmitting the sent frames to the frame destinations with the transmission timings so that
the transmitted frames are received at the frame destinations during the time periods,
the sent frames of the first group are transmitted successively, and
the second group of frames are transmitted before the other frames.

* * * * *